United States Patent [19]

Robinson et al.

[11] 3,822,945

[45] July 9, 1974

[54] OPTICAL SCANNING OF ELECTRICAL CABLE SHIELDS

[75] Inventors: Daniel E. Robinson, Metuchen; Robert A. Schmidt, Jr., Denville, N.J.

[73] Assignee: General Cable Corporation, New York, N.Y.

[22] Filed: Sept. 25, 1972

[21] Appl. No.: 291,640

[52] U.S. Cl. .................. 356/159, 250/562, 356/237
[51] Int. Cl. ............................................ G01b 11/04
[58] Field of Search .......... 356/159, 156, 160, 199, 356/200, 209, 212, 237, 238; 250/219 S, 219 DF, 227; 73/159, 160

[56] References Cited
UNITED STATES PATENTS

| | | | |
|---|---|---|---|
| 3,094,368 | 6/1963 | Peck | 73/160 |
| 3,327,584 | 6/1967 | Kissinger | 356/212 |
| 3,584,963 | 6/1971 | Wisner | 356/237 |
| 3,626,196 | 12/1971 | Arnaudin, Jr. et al. | 250/219 S |

Primary Examiner—Ronald L. Wibert
Assistant Examiner—Conrad Clark

[57] ABSTRACT

This apparatus, for detecting abnormalities in an electrical cable, has probes located at angularly spaced locations around the circumference of the cable. The probes are means for directing light beams against the surface of the cable and are light sensitive elements that pick up the light reflected from the cable surface. As the cable advances with continuous motion through a testing station, changes in the amount of light reflected operate detectors. Adjacent probes are connected with bridge circuits to make the operation independent of changes in the ambient light conditions. This feature utilizes axial as well as angular spacing of adjacent probes. A hinge sleeve for holding the probes facilitates application and removal of the test apparatus to and from the cable; and the sleeve opens automatically to pass protuberances of the cable which would strike the probes.

20 Claims, 11 Drawing Figures

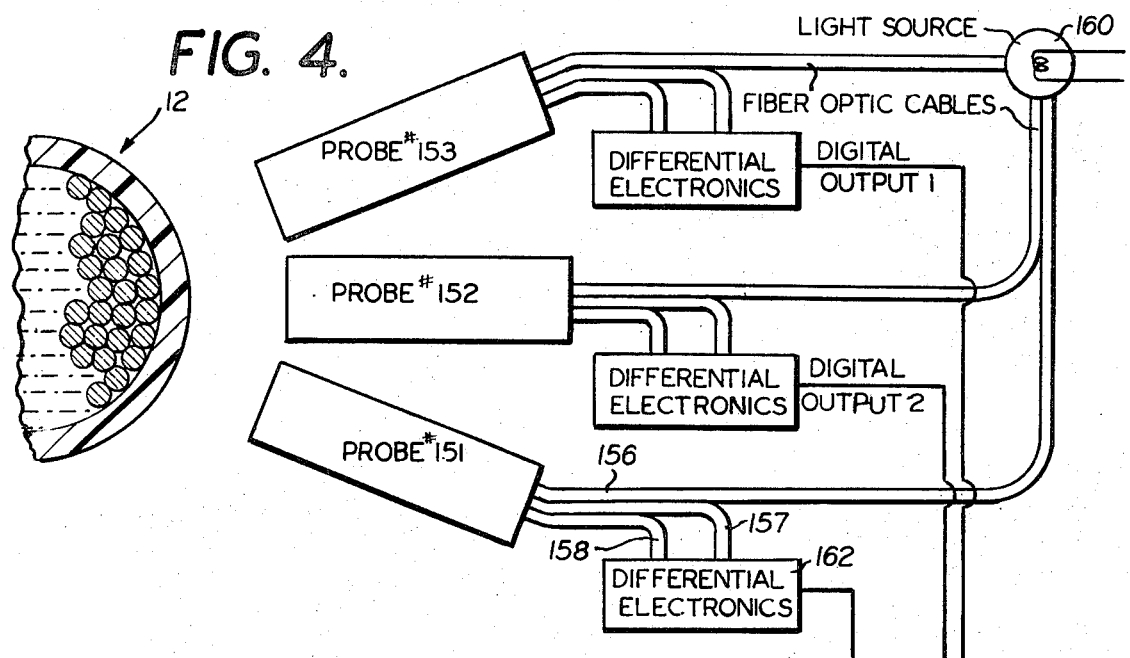
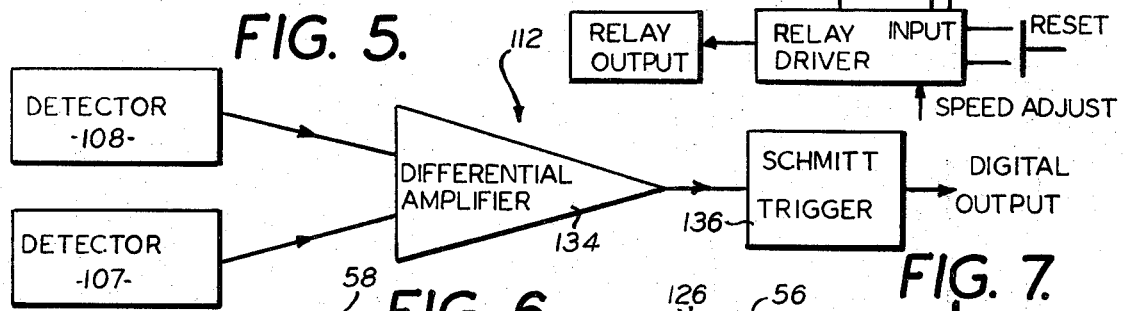
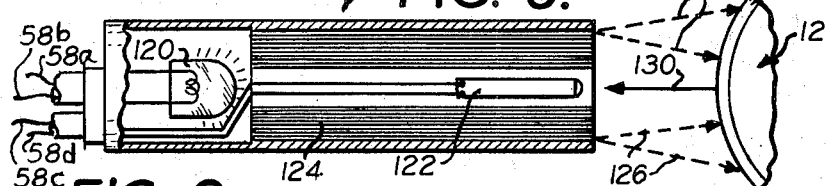
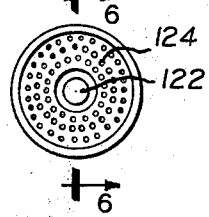
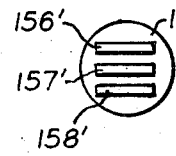
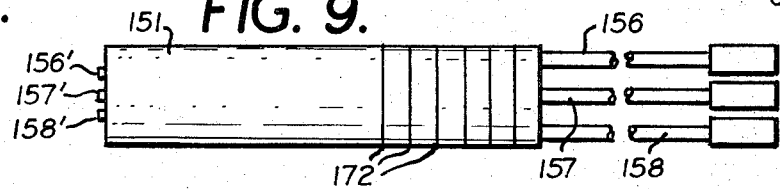
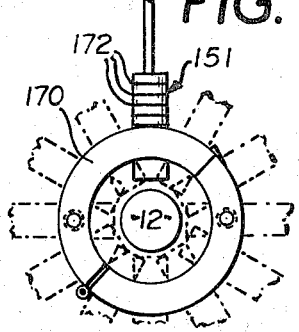
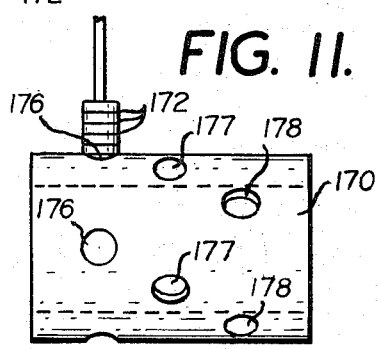

3,822,945

OPTICAL SCANNING OF ELECTRICAL CABLE SHIELDS

BACKGROUND AND SUMMARY OF THE INVENTION

The object of this invention is to test newly manufactured cable for abnormalities in the manufacture. Different kinds of tests are used for detecting imperfections in a cable; and this invention tests for variations in the shape or contour of the cable by directing light beams against the cable and then detecting any changes in the reflection of light from the cable surface.

This invention relates primarily to the detection of "skips" or voids in the semi-conductive jacket material used for conductor shields or insulation shields in the construction of high voltage power cables.

The detection is accomplished by means of a sufficient number of fiberoptic probes to accomplish a surveillance of 360° about the moving cable, arranged radially and held in position by a mount which is made in two pieces and hinged for easy installation and removal in the event that a situation occurs which would allow the moving cable to jam in the sensor head.

A probe assembly consists of a short length of fiber optic cable consisting of two coaxial channels, a light source, a photo-sensor, and a length of four conductor flexible cable. Two of the conductors are used to provide power to the light source, while the remaining two are used to connect the photo-sensor to a detector. Light is transmitted to the surface of a cable through the outer fiberoptic channel and the reflected light is returned to the photo-sensor through an inner fiberoptic channel. The output from the detectors of two adjacent photo-sensors are then amplified, one to each input of a differential amplifier, the output of which will be directly proportional to the difference in reflected light between the two photo-sensors.

When the two probes observe the same environment, or ambient, a balanced condition is present, and ambient noise, whether electrical or mechanical, ideally will cancel. However, due to a lack of perfect matching of components between channels a null adjustment is necessary.

Because of the circumferential offset between adjacent probes, a perturbation will be observed by one probe ahead of the other for at least a short length of time causing the differential amplifier to become unbalanced resulting in a much larger output to a Schmitt trigger. This causes the Schmitt trigger to change states, yielding the output necessary to indicate a perturbation, such as a skip or void. The sensitivity of the system is controled by adjusting the gain of the differential amplifier, by adjusting the triggering level of the Schmitt trigger, or both. The output of the Schmitt trigger drives a latching relay to yield a sustained output until manual reset.

A chart recorder can be used in conjunction with the monitoring system to record on the chart the location of skips or voids and from this chart a defect in the cable can be identified along the length of the cable.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 4 is a view showing a modified form of the invention illustrated in FIG. 4;

FIG. 5 is a wiring diagram showing the way in which adjacent probes are balanced by connecting them with a common amplifier which supplies power to a Schmitt trigger that operates digital output for the detection equipment of this invention;

FIG. 6 is a diagrammatic sectional view through one of the probes shown in FIG. 3;

FIG. 7 is a front view of the probe shown in FIG. 6;

FIG. 8 is a front view of one of the probes shown in FIG. 4;

FIG. 9 is a side elevation of the probe shown in FIG. 8;

FIG. 10 is a diagrammatic view illustrating the way in which the probes of FIGS. 8 and 9 are used in a holder around the circumference of a cable to be tested; and FIG. 11 is a side elevation of the probe holder shown in FIG. 10.

DESCRIPTION OF PREFERRED EMBODIMENTS

Figure 1:
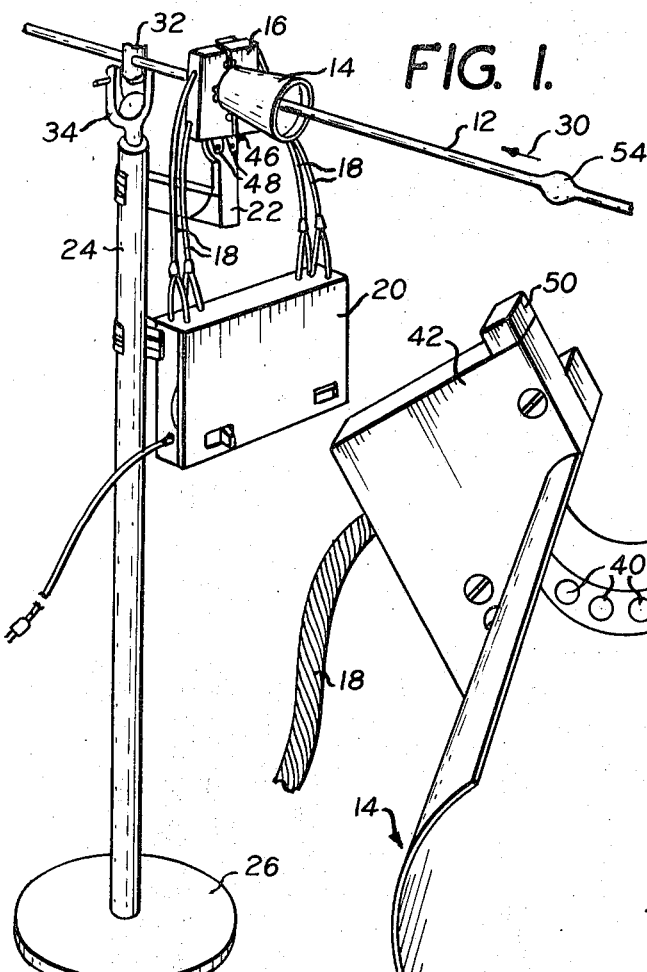
FIG. 1 is a view of the detection equipment of this invention mounted on a stand and located along the course followed by a cable moving longitudinally with continuous motion.

FIG. 1 shows a test station 10 through which a cable 12 passes with continuous motion. The test station includes a sleeve or guide 14 that surrounds the cable, and a frame 16 for supporting probes which sense the light reflected from the surface of the cable. The probes will be described in connection with other Figures, but FIG. 1 shows cables 18 extending from the probes of the frame 16 and leading to a cabinet 20 in which the detection equipment is contained.

The frame 16 is carried by a support 22 attached to a post 24 that extends downward to a base 26 resting on a floor or other support. The cabinet 20 is also supported from the post 24 by a bracket 28.

The cable 12 comes from a cable payoff or other supply moving in the direction of the arrow 30 and with continuous motion. In order to center the cable 12 in the frame 16, there is a guide 32 at the top of the post 24; and this guide 32 is carried by a bracket 34 which is vertically adjustable for effecting the centering of the cable 12 as it passes through the frame 16.

Figure 2:
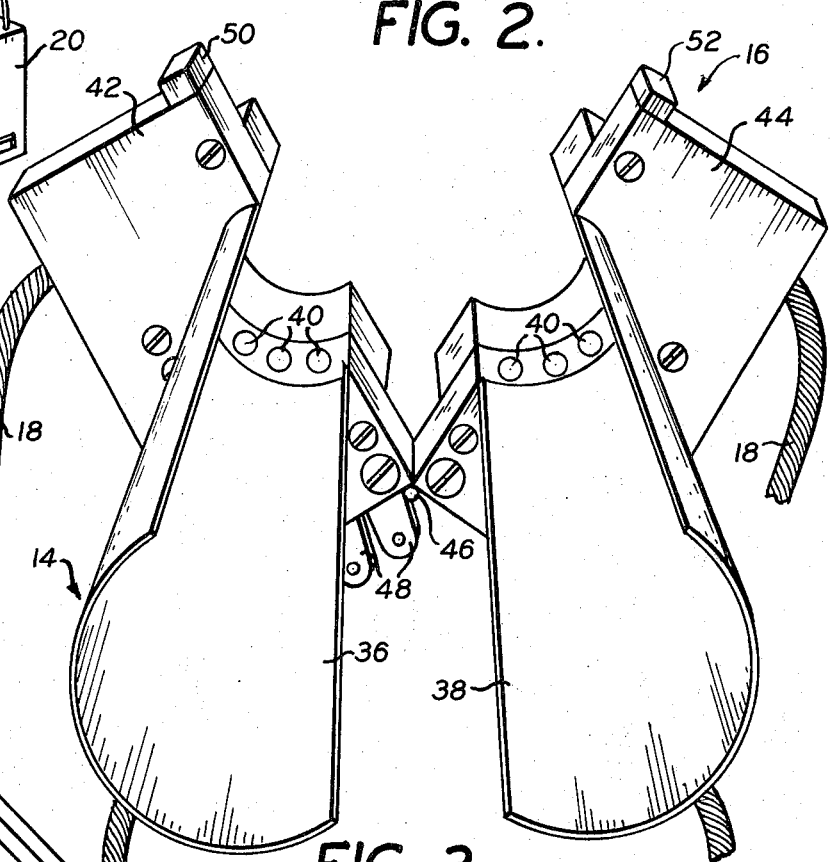
FIG. 2 is a greatly enlarged, diagrammatic view of the cable guide and probe supporting mechanism shown in FIG. 1.

FIG. 2 shows the guide 14 and frame 16 on an enlarged scale. The guide 14 is made up of two semisecular sleeve sections 36 and 38 which fit together to form a tapered sleeve that decreases in diameter as it extends downstream of the direction of movement of the cable through the test station. The sleeve sections 36 and 38 are rigidly connected with the frame 16. At a location near the downstream ends of the sleeve sections 36 and 38, there are radial openings 40 for receiving probes, which will be described in connection with the other views. These openings 40 locate the probes at angularly spaced locations around the circumference of the guide 14 and in the construction illustrated there are 12 probes at the test station, different number of probes can be used so long as they are designed and correlated to scan the entire circumferential extent of a cable passing through the guide 14. When the probes are located so they are flush with the inside surfaces of the sleeve sections 36 and 38, the circles 40 which represent the openings for holding the probes also represent the end faces of the probes.

The frame 16 is made in two sections 42 and 44; and these sections 42 and 44 are connected together by a hinge 46 so that they can be swung outward from one another, as shown in FIG. 2, to open up the guide 14. This feature by which the sections of the guide are hingedly connected makes it possible to apply the guide 14 and frame 16 around a cable at the test station 10 even though the end of the cable is not available.

The left hand frame section 42 has lugs 48 secured to the upper end of the support 22. This makes it possible to swing the right hand frame section 44 about the hinge 46 without disconnecting the frame 16 from the support 22.

Latch sections 50 and 52 on the frame sections 42 and 44, respectively, engage with one another when the frame sections 42 and 44 are brought together to close the guide 14. In the construction shown the latch sections 50 and 52 are magnetic elements that adhere to one another but it will be understood that this is merely representative of latch means which are releasable when pressure is applied to the sleeve sections 36 and 38 in a direction to open the sleeve. For example, if a lump 54 (FIG. 1) in the cable coating is of a diameter too large to pass through the guide 14, then this lump will open the guide 14 instead of causing a jam in the guide and possible damage to the equipment. The size of the guide 14 with respect to the cable and the size of the lump 54 are both exaggerated for clearer illustration.

Figure 3:
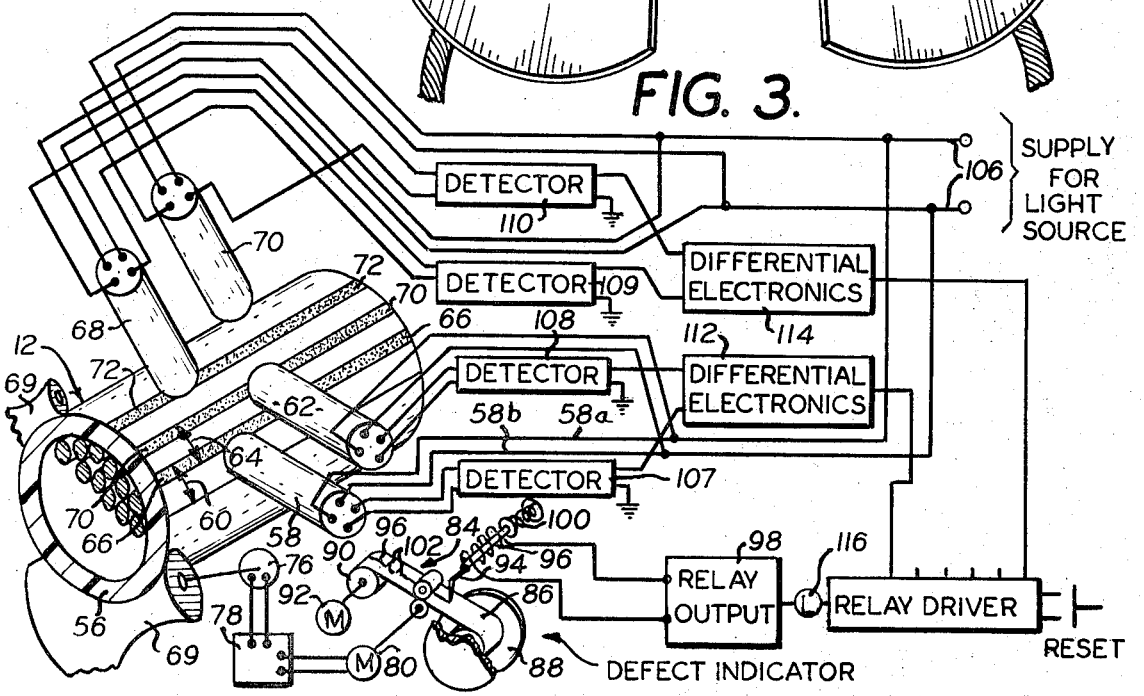
FIG. 3 is a diagrammatic view showing the correlation of probes to each other and showing detection and recording apparatus.

FIG. 3 shows the cable 12 on a greatly enlarged scale and shows a coating 56 surrounding the stranded conductor or core of the cable 12. A probe 58 scans an area of the coating 56 which has an angular extent indicated by the dimension arrow 60 in FIG. 3. An adjacent probe 62 scans an angular area having an extent equal to that indicated by the dimensional arrow 64. It will be observed that the areas indicated by the arrows 60 and 64 overlap one another along a zone 66.

In similar fashion, another probe 68 scans part of the same area as is scanned by the probe 66 and this common zone is indicated by the reference character 70. The probe 68 and another adjacent probe 70 scan a common zone 72; and in similar manner all of the probes around the circumference of the coating 58 scan areas which overlap with adjacent areas scanned by adjacent probes.

This overlapping feature makes it unnecessary to have the probes critically adjusted with respect to their spacing from the cable coating 56 and also makes it unnecessary to have exact concentricity of the cable 12 and the guide which holds the probes at their locations around the circumference of the cable.

Rollers 69 are shown in FIG. 3 in contact with the cable 12. These rollers rotate at a speed which is proportional to the lineal speed of the cable. Actually they are not located adjacent to the probes but the illustration in FIG. 3 is diagrammatic and the rollers 69 are merely representative of means responsive to the speed of the cable for controling recording apparatus. In actual practice, the rollers 68 contact with the conductor of the cable 12 at a location before the coating 56 is applied and thus avoid all risk of damaging the coating.

In the diagrammatic illustration of FIG. 3, the rollers 68 are connected by a tachometer generator 76 and controler 78 to a motor 80, such as a synchronous motor, which drives feed rolls 82 of a recorder 84. The feed rolls 82 advance a tape record 86 at a speed proportional to the speed at which the cable advances to the test station. The tape unwinds from a supply reel 88 and winds on a takeup reel 90 driven by a torque motor 92. A scriber 94 traces a line 96 on the tape record 86 and this scriber is actuated by a solenoid 96 energized from a relay control 98 to move the scriber against the pressure of a spring 100 and cause spikes 102 to be recorded on the record by the scriber. When the output of the relay control 98 returns to normal, the spring 100 returns the scriber 94 to its normal position over the tape record 86.

It will be understood that the recorder shown in FIG. 6 is merely diagrammatic and that various other types of recorders can be used. The feature of the recorder is that the spikes on the record correspond with defects in the cable and that the location of these defects along the actual length of the cable can be identified from the record by merely knowing the scale of the record with respect to the cable. For example if the recording tape 86 runs at a speed equal to one half the speed of the cable, then the defects recorded on the record will be at distances from the end of the record equal to one half of the distance of the actual defects from the location on the cable at which the recording was started.

Examples of construction of the probes 58, 62, 68 and 70 will be described in connection with other views. The probes shown in FIG. 3 each have four conductors coming from the outer ends of the probes and these conductors, indicated by the same reference character as the probe with letters $a$, $b$, $c$ and $d$ appended, lead to a power supply line 106 and to detectors 107, 108, 109 and 110.

Detectors for adjacent probes connect with differential electronics indicated by the control boxes 112 and 114. The differential electronics are used to operate a light 116 or audible or other signal and to operate the recorder 84.

The construction of the probe 58 is illustrated diagrammatically in FIG. 6. It will be understood that the other probes shown in FIG. 3 and those further around the circumference and not shown are the same as the probe 58. The probe 58 contains a lamp 120 which is connected by the conductors 58$a$ and 58$b$ to the power supply 106 (FIG. 3) a light sensitive detector 122 is located centrally in the probe 58 as shown in FIGS. 6 and 7. There is an annular fiber optical cable 124 in the probe 58 and this fiber optical cable 124 is indicated by the annular groups of circles in FIG. 7 representing on an exaggerated scale the end faces of the light conducting elements that make up the fiber optical cable.

Light from the lamp 120 enters the faces at the inner end of the fiber optical cable 124 and passes through the fiber optical cable in a direction toward the electrical table 12 which is being tested. Dotted shaft arrows 126 show light beams from the elements near the circumference of the fiber optical cable and it will be understood that there are similar light beams directed toward the coating 56 on the cable 12 across the entire radial extent of the face of the fiber optical cable 124 which confronts the coating 56 of the electrical cable 12.

Some of the light represented by the lines 26 and other light from the end of the fiber optical cable 124 reflects back from the surface of the coating 56 to the light sensitive element 122 which may be any well known photosensor or optical detector. The composite of light reflected from the coating 56 is indicated by the heavy arrow 130. The spacing of the light sensitive element 122 from the annular face of the fiber optic cable 124 determines the angular extent of the coating 56 which is scanned by the probe 58. Locating the light sensitive element 122 further to the left in FIG. 6; that is, further from the face of the fiber optic cable 124, reduces the angular width of the zone of the cable which is scanned by the probe 58 as the cable moves longitudinally past the probe. Any variation in the contour of the coating 56 from a cylindrical shape changes the amount of light reflected back to the light sensitive element 122 and thus changes the amount of current supplied by the light sensitive element 122 to the conductors 58c and 58d leading to the detector 107 (FIG. 3).

Referring to FIG. 3 it will be apparent that the differential electronics in the cabinet 112 are connected with the detector 107 of probe 58 and with the detector 108 of probe 62.

Referring to FIG. 5 the detectors 107 and 108 are connected with a differential amplifier 134 constituting part of the differential electronics 112. When the output from each of the detectors 107 and 108 is the same as that from the other, the differential amplifier 134 will be at a null point and there will be no output from the amplifier. Whenever the output from the detectors 107 and 108 is not equal, the differential amplifier supplies power to a Schmitt trigger 136 which is also part of the differential electronics 112 and this Schmitt trigger connects with the digital output of the differential electronics 112. The way in which the output signal created by the difference in the operation of the detectors 107 and 108 is used to operate a signal and/or a recorder, shown diagrammatically in FIG. 3, is not illustrated in detail since such electric controls with the necessary switches and relays are well understood in the art and detailed description is not necessary for a complete understanding of this invention.

FIGS. 4, 8 and 9 show a modified form of the invention. Probes 151, 152 and 153 are shown in FIG. 4 at angularly spaced locations around the cable 12. Each of these probes scans an angular extent of the outside circumference of the cable 12 and preferably overlapping areas and the operation is similar in principle to that already described but the construction of the probes is different from that described above. The probe 151 is shown in FIGS. 8 and 9 but it will be understood that all of the other probes may be in similar construction. This probe 151 has three fiber optic cables 156, 157 and 158 extending from end faces 156' 157' and 158' which are exposed at the end face of the probe 151 and which may be flush with the end face of the probe or protrude slightly as shown in FIG. 9 for clearer illustration. These faces may also be slightly recessed to change the angular extent of the cable that affects the probe 151.

The fiber optic cable 156 extends from the probe 151 to a common light source 160. Corresponding fiber optic cables from the probes 152 and 153 and from all of the other probes around the cable extend to the same light source 160. This makes it unnecessary to have any light sources in the probes and makes possible the use of a single bright light source which would be too large for inserting into any one of the probes.

The fiber optic cables 157 and 158 from the probe 151 lead to a differential electronics cabinet 162 which not only contains all of the apparatus of the cabinets 112 and 114 of FIG. 3 but which also contains the light sensitive elements to which light is supplied by the fiber optic cables 157 and 158 (FIG. 4).

The output from the differential electronics operated by the probes in FIG. 4 can be used to operate signals and a recorder in the same manner as the probes of FIG. 3 already described.

FIG. 10 shows the probe 151 held in a circumferential frame 170 which surrounds the cable 12 and which holds other angularly spaced probes indicated in broken lines, in positions extending radially from the cable 12. The feature of the construction shown in FIG. 10 is that the probe 151, and the other probes, can be adjusted radially in the frame 170 so as to accommodate cables of different diameter. In the construction illustrated there are lines 172 on the outside surface of the probe 151 for indicating the extent to which the probe projects into the open space surrounded by the frame 170.

FIG. 11 shows the frame 170 with different groups of openings 176, 177 and 178. The openings 176 are spaced from one another by 90° and so are the openings 177 and the openings 178; but each of these groups is spaced axially of the other group and the openings 177 are located 30° ahead of the openings 176 while the openings 178 are located 30° ahead of the openings 177. Thus the frame 177 has an opening through its circumference every 30° of its angular extent, but none of the openings in a circumferential group are closer than 90°. This makes it possible to adjust the probes closer to the axis of the frame 170. For example the probes shown in broken lines in FIG. 10 appear to overlap one another, and the projections of them in an axial direction do overlap but actually they do not touch each other because of the fact that they are divided into different groups staggered along the length of the frame 170 as shown in FIG. 11. This feature permits much greater adjustment of the probes to accommodate cables of smaller size.

The preferred of the invention has been illustrated and described, but changes and modifications can be made and some features can be used in different combinations without departing from the invention as defined in the claims.

What is claimed is:

1. Apparatus for detecting abnormalities in the coating on an electrical cable including in combination a test station through which a cable passes with continuous motion in the direction of the length of the cable, guide means supporting the cable against transverse movement when passing through the test station, a plurality of probes including light-receiving elements at angularly spaced locations around the cable at the test station, each probe being in position to scan a different angular portion of the surface of the circumferential area of the cable, and to pick up light reflected from said portion of the cable as the cable passes through the test station, light sensitive electrical devices in each probe for receiving light picked up by said elements, each of the light sensitive electrical devices producing an output responsive to the intensity of the light reflected from the cable to the probe, differential electronic means, a connection between the light-sensitive electrical devices of one of the probes and the differential electronic means, another connection between the light-sensitive electrical devices of a second probe and the differential electronic means, a circuit within said electronic means to which said connections are differentially connected to supply an output from said circuit that is dependent upon the differences in the intensity of the light scanned by the different probes and to balance the probes against the general background environment light common to different portions of the surface being scanned by the probes.

2. The apparatus described in claim 1 characterized by each of the light receiving elements scanning a portion and only a portion of the angular extent of the circumference of the cable, and the combined angular extent of the areas scanned by all of the light receiving elements including the entire circumference of the cable.

3. The apparatus described in claim 2 characterized by the light receiving elements being located in positions to scan a part of the area scanned by the next successive light receiving element on both sides thereof.

4. The apparatus described in claim 1 characterized by successive angularly spaced light receiving elements being also spaced axially of one another along the cable so that they scan the surface of the cable coating at different locations along the length of the cable at any given instant of time, whereby individual probes can span a greater angular extent of the cable without interfering with adjacent probes.

5. The apparatus described in claim 1 characterized by supporting means for the light responsive elements including a sleeve at the test station, the guide means holding the cable in substantial alignment with the axis of the sleeve and out of contact with the probes, the light receiving elements extending generally radially of the sleeve, the sleeve being long enough to shade the surface of the coating from ambient light, and illuminating means within the sleeve for radiating a substantially uniform illumination to the surface of the coating at the area scanned by the light receiving elements.

6. The apparatus described in claim 5 characterized by each of the light receiving elements being held by the sleeve and being elongated in a radial direction and each of the light receiving elements being adjustable radially with respect to the sleeve to change the spacing of the inner ends of the light receiving elements from the axis of the sleeve to accommodate the apparatus to cables of different size.

7. The apparatus described in claim 1 characterized by a light source in each of the probes in position to direct light against the surface of the cable, there being one of the light sensitive electrical devices in each of the probes shielded from the light source and in position to receive light reflected directly from the surface of the cable.

8. The apparatus described in claim 1 characterized by each probe including two coaxial channels, one of which is a length of fiber optic cable, one of said channels having means that supplies light to the surface of the cable and the other of said channels conveying reflected light from the cable surface to the light sensitive electrical device, whereby successive probes can be used to scan circumferentially overlapping areas of the electrical cable.

9. The apparatus described in claim 8 characterized by an electric light in each probe for supplying light to one of the channels, and a light sensitive electrical device in each of the probes to which reflected light is supplied by the other of said channels.

10. The apparatus described in claim 1 characterized by the detectors of different probes being connected to a differential amplifier that operates a Schmitt trigger circuit in response to a predetermined difference in the light reaching said detectors of the different probes.

11. The apparatus described in claim 1 characterized by the detectors of the different probes that are differentially connected having detectors of successive probes around the circumference of the cable, and all of the differentially connected detectors being connected with a common relay driver for operating a relay of an abnormality indicator.

12. The apparatus described in claim 1 characterized by an abnormality indicator connected with all of the probes and operated in response to a localized change in reflected light picked up by any of the light receiving elements.

13. The apparatus described in claim 12 characterized by the abnormality indicator including apparatus that measures the length of cable passing through the test station, and means operated by the detectors for indicating the location along the length of the cable at which an abnormality occurs.

14. The apparatus described in claim 13 characterized by the apparatus that measures the length of cable passing through the test station including a tape that runs at a speed coordinated with that of the cable and the means for indicating the location of an abnormality being a marker operated in response to signals from the probes for applying a mark to the tape as each abnormality is detected.

15. Apparatus for detecting abnormalities in the coating on an electrical cable including in combination a test station through which a cable passes with continuous motion in the direction of the length of the cable, guide means supporting the cable against transverse movement on passing through the test station, a plurality of probes including light-receiving elements at angular spaced locations around the cable at the test station and in positions to pick up light reflected from the surface of the cable, light sensitive electrical devices that receive light picked up by said elements, and detectors connected with the light sensitive electrical devices for indicating a change in the amount of light reflected from the cable characterized by supporting means for the light receiving elements including a sleeve at a test station, the guide means holding the cable in substantial alignment with the axis of the sleeve and out of contact with the sleeve, the sleeve being constructed in two parts, a hinge connecting the two parts on one side with the axis of the hinge extending generally parallel to the longitudinal axis of the sleeve, whereby the sleeve can be opened for removing it from the cable.

16. The apparatus described in claim 15 characterized by the sleeve having a sloping surface that diverges from the longitudinal axis of the sleeve in the direction from which the cable enters the sleeve, said diverging surface being in position to contact with any protruberance extending from the side of the cable whereby the increase in cross-section of the cable causes the sleeve to open to prevent contact of the protruberance with any of the probes within the sleeve.

17. The apparatus described in claim 15 characterized by contact surface upstream from the part of the sleeve that supports the probes and in position to be displaced by any protruberance on the cable that extends beyond the circumference of a circle tangent to the inner ends of all the probes, and means connected with said contact surface for automatically opening the sleeve to remove the probes from the path of said protrusion of the cable.

18. The method of detecting abnormalities in a coating on an electrical cable including advancing a coated cable continuously in the direction of its length, surrounding the cable with angularly spaced detector probes in positions to scan circumferentially overlapping areas of the cable surface, receiving reflected light into all of the probes from the surface of the cable around the entire circumference thereof at a test station, operating differential electronic detection devices by signals generated in response to changes in the intensity of the reflected light received by the respective probes, supplying signals from different probes to the same electronic detection device through differentially related circuit connections to obtain an output from the detection device that is dependent upon the differences in the intensity of the light scanned by the different probes and to balance the probes against the general background environment light common to different portions of the surface being scanned by the probes.

19. The method described in claim 18 characterized by shielding the cable at the test station from ambient light, applying controled light to the surface of the cable while thus shielded, picking up the reflected light from the surface of the cable at angularly spaced locations around the circumference of the cable with different probes that include light receiving elements and light sensitive electrical devices, and connecting successive probes differentially to balance the output of one against the other when successive probes receive the same intensity of light.

20. The method described in claim 18 characterized by advancing a tape that corresponds to the length of the cable passing through the test station, and operating a marker automatically by signal from any of the detection devices to indicate on the tape the location of any abnormalities in the surface of the coating on the cable.

* * * * *